(12) United States Patent
Diebold et al.

(10) Patent No.: US 9,280,160 B2
(45) Date of Patent: Mar. 8, 2016

(54) REGULATING VALVE, IN PARTICULAR FOR THE ELECTROPROPORTIONAL REGULATION OF THE PIVOT ANGLE OF A HYDRAULIC MACHINE

(71) Applicant: Robert Bosch GmbH, Stuttgart (DE)

(72) Inventors: Carola Diebold, Eutingen (DE); Andreas Apperger, Eutingen (DE)

(73) Assignee: Robert Bosch GmbH, Stuttgart (DE)

( * ) Notice: Subject to any disclaimer, the term of this patent is extended or adjusted under 35 U.S.C. 154(b) by 303 days.

(21) Appl. No.: 14/084,682

(22) Filed: Nov. 20, 2013

(65) Prior Publication Data
US 2014/0137955 A1 May 22, 2014

(30) Foreign Application Priority Data
Nov. 20, 2012 (DE) .......................... 10 2012 022 694

(51) Int. Cl.
*F16K 31/06* (2006.01)
*G05D 7/06* (2006.01)
*F03C 1/40* (2006.01)
*F04B 1/32* (2006.01)

(52) U.S. Cl.
CPC ............ *G05D 7/0629* (2013.01); *F03C 1/0686* (2013.01); *F04B 1/324* (2013.10); *F16K 31/0613* (2013.01); *Y10T 137/7761* (2015.04)

(58) Field of Classification Search
CPC ...................... F16K 31/0613; Y10T 137/7761; Y10T 137/7925; F15B 13/044; F15B 13/0402; F15B 13/0405; F15B 13/0407; F15B 11/0445; F15B 2211/5059; F15B 2211/20553; F04B 1/324; F04B 1/20; F04B 53/10; F04B 39/10; F04B 2201/06; F04B 49/002; F04B 49/08; G05D 7/0629
USPC ......... 251/318, 324; 137/538, 625.64; 91/468
See application file for complete search history.

(56) References Cited

U.S. PATENT DOCUMENTS

| | | | |
|---|---|---|---|
| 6,725,658 B1* | 4/2004 | Lemmen | F04B 1/324 60/443 |
| 2010/0139476 A1* | 6/2010 | Desbois-Renaudin | F15B 11/003 91/468 |
| 2015/0226204 A1* | 8/2015 | Klausmann | F04B 1/20 417/506 |

FOREIGN PATENT DOCUMENTS

| | | |
|---|---|---|
| DE | 199 52 800 A1 | 8/2000 |
| DE | 10 2008 035 133 A1 | 2/2009 |
| DE | 10 2008 038 435 A1 | 2/2009 |

OTHER PUBLICATIONS

Bosch Rexroth AG, Axial Piston Variable Pump A10VO, Data Sheet RE 92703/08.11, Aug. 2011, Horb a. N., Germany (56 pages) (English translation of German language document Data Sheet RD 92703/08.11).
Bosch Rexroth AG, Axial Piston Variable Pump A15VSO, Data Sheet RE 92800/05.12, May 2012, Horb a. N., Germany (40 pages) (English translation of German language document Data Sheet RD 92800/05.12).

* cited by examiner

*Primary Examiner* — Marina Tietjen
(74) *Attorney, Agent, or Firm* — Maginot, Moore & Beck LLP

(57) ABSTRACT

A regulating valve, in particular an electroproportional pivot-angle regulator for a variable-displacement pump, includes a piston bore formed in a valve housing and a regulating piston guided in the piston bore. The regulating piston is configured to be actuated in an adjusting direction via an actuator, in particular via a lifting magnet. The regulating piston is acted upon in the opposite direction by a spring force of a counter-spring. The counterspring is supported via a spring plate on a supporting spring which is supported on the valve housing. The spring plate is tensioned between the supporting spring and an adjusting device by which the spring plate is configured to be displaced in relation to the valve housing in or opposite to the adjusting direction.

17 Claims, 2 Drawing Sheets

REGULATING VALVE, IN PARTICULAR FOR THE ELECTROPROPORTIONAL REGULATION OF THE PIVOT ANGLE OF A HYDRAULIC MACHINE

This application claims priority under 35 U.S.C. §119 to patent application no. DE 10 2012 022 694.2 filed on Nov. 20, 2012 in Germany, the disclosure of which is incorporated herein by reference in its entirety.

BACKGROUND

The disclosure relates to a regulating valve which is provided, in particular, for the electroproportional regulation of the pivot angle on a hydraulic machine as a swashplate type and which has the features according to the disclosure. The disclosure relates, moreover, to a hydraulic system having a regulating valve of this kind.

DE 10 2008 035 133 A1 discloses a regulating valve of this kind for a hydraulic axial-piston variable-displacement pump. The regulating valve is part of an actuating device for adjusting a stroke volume of the variable-displacement pump. The actuating device engages on a pivoting rocker of the variable-displacement pump by means of a swing-in piston of a swing-in cylinder and by means of a swing-out piston of a swing-out cylinder. The variable-displacement pump can be adjusted via the swing-in piston in the direction of a lower delivery volume and via the swing-out piston in the direction of a higher delivery volume. To swing out the pivoting rocker, the swing-out piston can be acted upon with a pressure medium via an actuating pressure space, as result of which an actuating pressure can act on this swing-out piston. The swing-in piston can likewise be acted upon with a pressure medium via an actuating pressure space in order to swing-in for the pivoting rocker. The actuating pressure for the swing-in piston is regulated via the regulating valve.

The continuously adjustable regulating piston of the regulating valve is acted upon via a first valve spring with a spring force in the direction of regulating positions in which the actuating pressure space of the swing-in piston is connected to the high-pressure side of the variable-displacement pump. The regulating piston can be acted upon in the opposite direction with a spring force of a second valve spring, the spring force being adjustable. Action upon the regulating piston by the second valve spring then takes place in the direction of regulating positions in which the actuating pressure space of the swing-in piston is connected to the tank. The delivery pressure acts on the regulating piston via a lever device counter to the spring force of the second valve spring. The lever device is a hyperbolic controller, via which the regulating piston of the regulating valve can then be activated as a function of the delivery pressure of the variable-displacement pump.

The applicant's data sheet RD 92800/05.12 discloses a further embodiment of a regulating valve on a variable-displacement pump. The regulating valve is in this case part of a power controller. According to the above-explained embodiment of DE 10 2008 035 133 A1, a regulating piston of the regulating valve can be acted upon by spring forces of two counter acting valve springs. The second valve spring, here too, is configured in such a way that one spring force is adjustable. The delivery pressure of the variable-displacement pump likewise acts counter to the spring force of the second valve spring via a lever device. Furthermore, the regulating piston of the regulating valve is constantly displaceable in the active direction of the first valve spring via a lifting magnet, that is to say into regulating positions in which the actuating pressure space of the swing-in piston is connected fluidically to a high-pressure side of the variable-displacement pump.

A lifting magnet for adjusting the regulating piston of the regulating valve is illustrated in DE 199 52 800 A1. This has a magnet armature which is guided slidably in a pole tube and by means of which it can displace an armature tappet, while the latter, in turn, can engage on the regulating piston of the above-explained regulating valve. The first valve spring of the above-explained regulating valve can be supported on a spring plate of the lifting magnet. Said spring plate is supported, in turn, on a pin, arranged in the magnet housing, of an adjusting device, via which the spring plate can be displaced axially in order to set the spring force of the first valve spring.

DE 10 2008 038 435 A1 shows a further embodiment of a regulating valve. In this case, the regulating piston can be displaced in the direction of first regulating positions, in which the actuating pressure space of the swing-in piston is connected fluidically to the tank, and in the direction of second regulating positions, in which the actuating pressure space is connectable to the high-pressure side of the variable-displacement pump. The regulating piston can be acted upon in the direction of the first regulating positions by the magnetic force of a first lifting magnet and by the spring force of a valve spring. The regulating piston can be acted upon in the direction of the second regulating positions by a spring force of a feedback spring and by a magnetic force of a further lifting magnet. The spring force of the valve spring which acts in the direction of the first regulating positions can be adjusted via an adjusting device. The valve spring is in this case supported on a spring plate, of which the side pointing away from the valve spring has a frustoconical configuration. A pin engages on the frustoconical side, which pin is inserted radially to the longitudinal axis of the regulating piston in a valve housing of the regulating valve and can be displaced in its axial direction. If, for example, the pin is displaced toward the spring plate, the pin slides along the frustoconical side of the spring plate, with the result that the latter is displaced in the direction of an increasing spring force of the valve spring. If the pin is adjusted in the opposite direction, it slides outward, radially away from the regulating piston, along the frustoconical side of the spring plate, with result that the spring plate is displaced in the direction of a decreasing spring force of the valve spring. The pin is fixed and secured to the valve housing via a lock nut. In the regulating valve, the adjustable spring force of the spring acts on the regulating piston in the same direction as the magnetic force of the first lifting magnet.

By contrast, the object on which the disclosure is based is to provide a regulating valve having a simple configuration in terms of apparatus and a hydraulic system having a regulating valve of this kind.

SUMMARY

The object is achieved with regard to the regulating valve having the features of the disclosure and with regard to the hydraulic system having the features of the disclosure. Other advantageous developments of the disclosure are the subject matter of further subclaims.

In particular, a regulating valve as an electroproportional pivot-angle regulator of a hydraulic machine of the swashplate type, in particular of an adjustable axial-piston pump with a swashplate, is provided. However, it can also be used in stationary applications in industrial hydraulics. The regulating valve has a valve housing in which a piston bore is formed. A regulating piston is guided slidably in the latter and can be displaced axially in an adjusting direction via an actuator, in particular a lifting magnet. By means of a counterspring, the regulating piston is acted upon with a spring force opposite to the adjusting direction, the counterspring being supported on a spring plate. The latter is acted upon, via its side pointing away from the counterspring, by a supporting force of a supporting spring which is supported on the valve housing of the regulating valve. By means of an adjusting device, the spring plate is acted upon, particularly via the side of the spring plate which points toward the counterspring, by an adjusting force acting counter to the supporting force. The spring plate is thus displaced, with a rising adjusting force, in a direction toward the supporting spring and, with a falling adjusting force, in a direction away from the supporting spring, as result of which, in turn, the spring force of the counterspring which is supported on the spring plate can be adjusted.

The spring plate is thus advantageously fixed securely between the adjusting device and the counterspring by the adjusting force and the spring force. Furthermore, the counterspring spring force acting counter to a force on the actuator can be set by means of the spring plate in a simple way in terms of apparatus.

In a further refinement of the disclosure, the adjusting device has a pin which is arranged axially displaceably in the valve housing and engages on that side of the spring plate which points away from the supporting spring, and via which the spring plate can be acted upon by the adjusting force. The pin in this case cooperates with the spring plate in such a way that axial displacement of the pin leads to axial displacement of the spring plate in the axial direction of the regulating piston.

The supporting spring is advantageously designed as a cup spring, with result that it is highly compact and has a low construction space requirement.

The spring plate may be configured as a bush and at least partially surround the counterspring, with result that the latter can be guided by the bush. The axial length of the bush makes it possible to determine a distance, as seen in the axial direction of the regulating valve, between the supporting spring and the pin. The pin can thus be at a comparatively long and determinable distance, as seen in the axial direction of the regulating valve, from the supporting spring. An arrangement of the pin and of the supporting spring in the valve housing is thus extremely flexible.

An oblique bore is preferably formed for the pin in the valve housing and extends obliquely to the longitudinal axis of the regulating piston and from the spring plate in a direction away from the supporting spring. Thus, in the event of axial displacement, the pin is displaced radially and axially to the longitudinal axis of the regulating piston. Owing to the oblique arrangement of the pin, the adjusting force can advantageously be introduced to the spring plate in a comparatively flat way, with the result that comparatively low force deflection occurs. Furthermore, the oblique bore makes it possible that the pin can extend away from the bush in the axial direction of the regulating valve. Access to the pin in order to displace the latter can thus be afforded at an axial distance from the bush. When the bush is located inside a housing, in particular a hydraulic machine housing, for example in the mounted state of the valve housing, designed as a valve sleeve, of the regulating valve, the pin can be guided through the oblique bore from the bush axially to an externally accessible outer face or end face of the valve housing. Furthermore, the result of a combination of the bush and of the oblique bore is that there is a comparatively long axial distance between an outer orifice of the oblique bore and the supporting spring.

In one embodiment, the pin can simply be screwed into the oblique bore via a threaded portion.

Alternatively, it is conceivable that a further oblique bore issues into the first oblique bore and is angled to the first oblique bore. A setscrew is preferably screwed into said further oblique bore, the pin being supported on said threaded pin and the pin being axially displaceable via the latter. In this case, it is advantageous, furthermore, that standard parts can be used for the threaded pin and for the pin.

The actuator is advantageously a lifting magnet with a magnet coil. The oblique bore of the pin or of the threaded pin can then be covered at least partially by the magnet coil from an outer side of the valve housing. In order to set the spring force of the counterspring, it is therefore sufficient if merely the magnet coil of the lifting magnet is removed. The rest of the lifting magnet can remain on the valve housing, with the result that the latter remains closed and the regulating valve is protected from contamination during the process of setting the counterspring. Since the lifting magnet remains, in particular with its pole tube, in the valve housing during the setting process, there is less risk that said lifting magnet is screwed in with too high a torque. Thus, with a regulating valve of this kind, as well as having short setting times, current/pivot-angle assignment can take place in a simple way by simply setting the spring force of the counterspring.

In order to seal off one or both of the oblique bores, an expander can be inserted into these from outside. The expander can additionally prevent maladjustment of the pin having the threaded portion or of the threaded pin.

Advantageously, the regulating piston, in the adjusting direction, controls a connection between a tank duct and an actuating pressure duct and, in the opposite direction, controls a connection between a delivery pressure duct and the actuating pressure duct. The ducts are in this case formed in the valve housing. The piston can be acted upon opposite to the adjusting direction by a spring force of a measuring spring. The regulating valve can thus be used as a pivot-angle regulating valve, as is shown, for example, in the applicant's data sheet RD 92703/08.11 explained in the introduction. In this case, the tank duct is then connectable to a tank, the actuating pressure duct to an actuating pressure space of a swing-in piston and the delivery pressure duct to the high-pressure side of the variable-displacement pump. The spring force of the measuring spring can then be dependent upon the variable-displacement pump. In a regulating valve of this kind, by means of the spring force of the counterspring, a start of regulation can be set, at which the regulating piston can be displaced from its spring-prestressed basic position by an actuator force of the actuator counter to the spring forces of the counterspring and of the measuring spring.

Preferably, on the regulating piston, an, in particular, annular radial projection is provided, via which the counterspring can act upon said regulating piston with the spring force. The radial projection of the regulating piston can in this case preferably penetrate into the bush, with result that the regulating valve has an extremely compact configuration. Alternatively to the radial projection, the bearing support of the counterspring can be formed via a spring ring or a securing ring with a washer, so that an especially small amount of construction space is required for the counterspring.

In a further advantageous refinement, the piston bore of the regulating valve has a guide portion for the slidable guidance of the regulating piston, while ducts, the pressure medium connection of which is controlled by the regulating piston, can issue into the guide portion. The guide portion advantageously has adjoining it, in the region of an actuator-side end portion of the regulating piston, a radially widened step with a step face which points toward the actuator and on which the cup spring is supported.

To connect the actuator to the valve housing, the piston bore has a threaded portion adjoining the step and having an internal thread, which threaded portion may have approximately the same diameter as the step, and the actuator being screwable into said internal thread.

Advantageously, when the valve housing of the regulating valve is in a state inserted into a housing, in particular a hydraulic machine housing, the adjusting device is accessible from outside, with result that it is not necessary to demount the valve housing in order to adjust the adjusting device. For this purpose, the valve housing may be designed, for example, as a valve sleeve having an outer face which is accessible from outside and in which the oblique bore for the pin and/or for the threaded pin issues.

According to the disclosure, a hydraulic system having a variable-displacement pump of the swashplate type is provided, which has a regulating valve according to the disclosure as a pivot-angle regulating valve. By means of the regulating valve according to the disclosure, the start of regulation can be determined in a simple way by setting the spring force of the counterspring.

BRIEF DESCRIPTION OF THE DRAWINGS

The disclosure is explained in more detail below by means of diagrammatic drawings in which.

DETAILED DESCRIPTION

Figure 1:
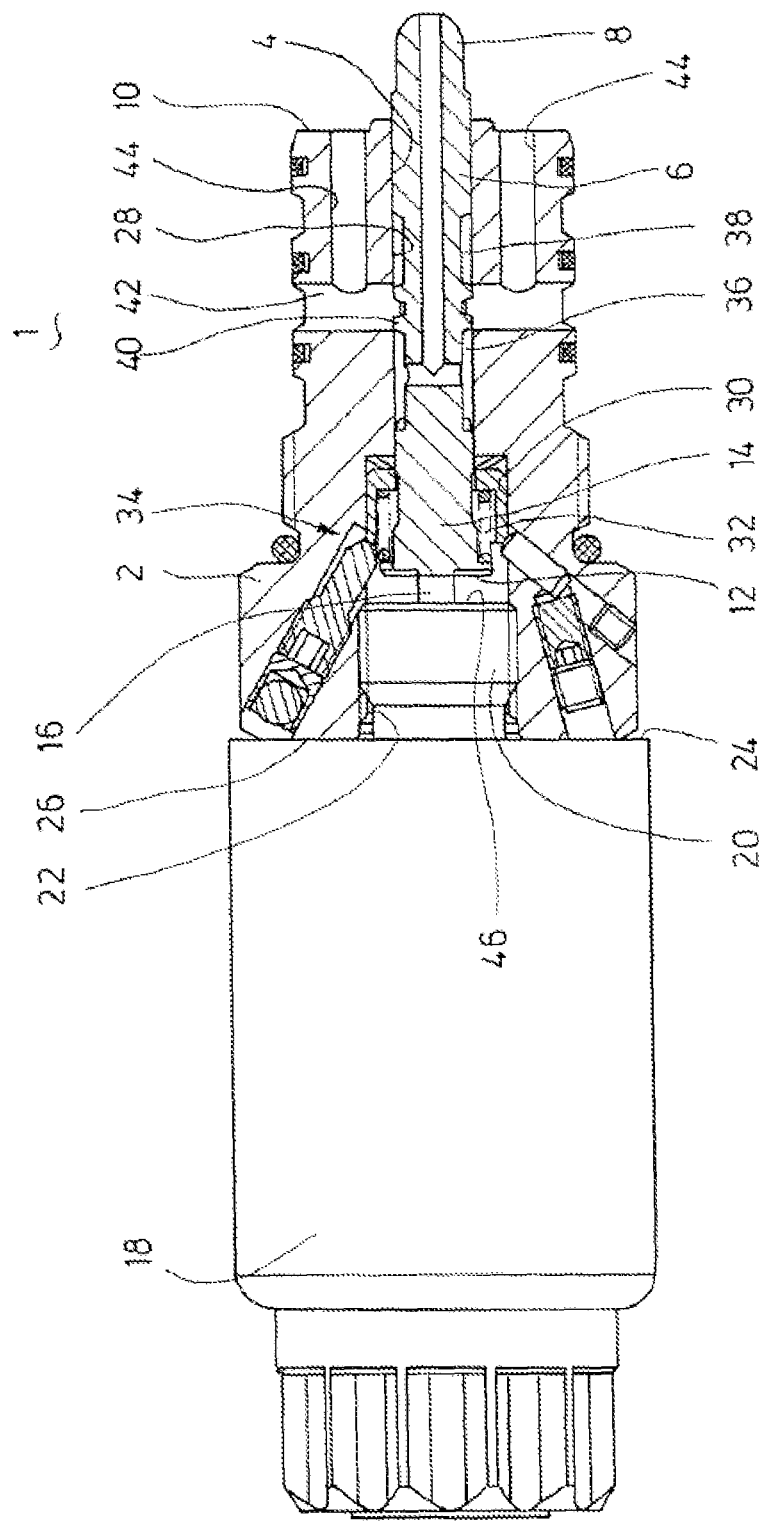
FIG. 1 shows a regulating valve according to the disclosure in longitudinal section, a first embodiment being illustrated above a longitudinal axis of the regulating valve and a second embodiment being illustrated below the longitudinal axis.

The regulating valve 1 according to the disclosure, according to FIG. 1, is used, for example, as an electroproportional pivot-angle regulator for an A10 variable-displacement pump of the swashplate type for electroproportional pivot-angle regulation. An electroproportional pivot-angle regulator is illustrated, for example, in the applicant's data sheet RD 92703/08.11.

The regulating valve 1 in FIG. 1 has a valve housing 2 which is designed as a valve sleeve and in which a piston bore 4 passing completely through the valve housing 2 is provided. The valve housing 2 is in this case configured in such a way that it can be partially inserted in a cartridge-like way into a valve receptacle of the variable-displacement pump. Guided slidably in the piston bore 4 is a regulating piston 6. This has an end portion 8 which projects out of the valve housing 2 and on which a spring plate, not illustrated, for a measuring spring of the variable-displacement pump can be supported. The measuring spring, in turn, can act with a spring force, in particular, upon a pivoting piston, not illustrated, in order to pivot a swashplate of the variable-displacement pump in the direction of a decreasing delivery volume. An end face 10 of the valve housing 2, out of which end face the end portion 8 of the regulating piston 6 projects, can then, for example, delimit an actuating pressure space, not illustrated, via which the pivoting piston can be acted upon with pressure medium.

An armature tappet 16 of a lifting magnet 18 is supported on an end face 12 of the regulating piston 6, which end face extends approximately in the radial direction to the longitudinal axis of the piston bore 4, points away from the end portion 8 and is formed on a further end portion 14 of the regulating piston 6. This is screwed with its pole tube 20 into a threaded portion 22 of the piston bore 4. A screw-in depth of the lifting magnet 18 is limited in that a housing side 24, pointing toward the valve housing 2, of the lifting magnet 18 comes to bear, for example, against that end face 26 of the valve housing 2 which points away from the end face 10 of the valve housing 2, both the housing side 24 and the end face 26 extending approximately in the radial direction to the longitudinal axis of the piston bore 4.

The regulating piston 6 is guided slidably in a guide portion 28 of the piston bore, which guide portion extends from the end face 10 pointing away from the lifting magnet in the direction of the lifting magnet 18. The piston bore 4 has, adjoining the guide portion 28, a radially widened step 30 which the threaded portion 22 adjoins. The step 30 and the threaded portion 22 have in this case approximately an identical inside diameter. In the region of the step 30, in the valve housing 2, a counterspring 32 according to the disclosure is provided, the spring force of which can be set via an adjusting device 34, as is explained in more detail below in FIG. 2.

The regulating piston 6 has a first and a second annular groove 36 and 38 which are arranged in series and which together with the piston bore 4 delimit in each case an annular space. The annular grooves 36 and 38 form between them a radial collar 40 on the regulating piston 6. The annular space arranged nearer to the lifting magnet 18 in FIG. 1 and delimited by the annular groove 36 is connected to a tank duct, not illustrated, which is formed in the valve housing 2 and which is connectable in turn to a tank. Furthermore, the annular space delimited by the annular groove 36 is connected via a transverse and longitudinal bore in the regulating piston 6 to end face upstream of the end portion 8 of the latter. The other annular space delimited by the annular groove 38 is connected to a delivery pressure duct, not illustrated, which is formed in the valve housing 2 and which is connectable in turn to a high-pressure side of the variable-displacement pump. An actuating pressure duct 42 is formed radially to the piston bore 4 in the valve housing 2 and passes completely through the latter. At least two longitudinal bores 44 issue in said actuating pressure duct, extend from the end face 10 of the valve housing 2 at a parallel distance from the piston bore 4 and thus, for example, connect the actuating pressure space, not illustrated, to the actuating pressure duct 42. In specific applications, the annular groove 36 may be connected to a further regulating valve, for example to a pressure regulating valve or to a delivery flow regulating valve. Then, via the transverse bore and the longitudinal bore of the regulating piston and via a nonreturn valve, which is formed by a spring plate, seated on the end portion 8 of the regulating piston, of a feedback spring, which feeds back the position of the pivoting rocker as a force to the regulating piston, and by the regulating piston, pressure medium can flow out of the actuating pressure space in order to reduce the pivot angle of the pivoting rocker independently of the position of the regulating valve shown.

The regulating piston 6 can be displaced axially via the armature tappet 16 in an adjusting direction in which it is displaced away from the lifting magnet 18. In this adjusting direction, the regulating piston 6 controls a pressure medium connection between the annular space, delimited by the annular groove 36 and connected to the tank duct, not illustrated, and the actuating pressure duct 42 via the radial collar 40 of said regulating piston. In the opposite adjusting direction, that is to say in the event of a displacement of the regulating piston 6 toward the lifting magnet 18, said regulating piston controls a pressure medium connection between the annular space, delimited by the annular groove 38 and connected to the delivery pressure duct, not illustrated, and the actuating pressure duct 42 via the radial collar 40 of said regulating piston. In the position shown in FIG. 1, both annular spaces are separated from the actuating pressure duct 42. In the dead position of resting of the valve, the regulating piston 6 essentially bears with its end face 12 pointing toward the lifting magnet 18 against an end face 46 of the pole tube 20. For this purpose, a plurality of radial grooves are introduced into the end face 12 of the regulating piston 6, so that this end face can adhere only with low forces to the end face 46 of the pole tube 20.

Figure 2:
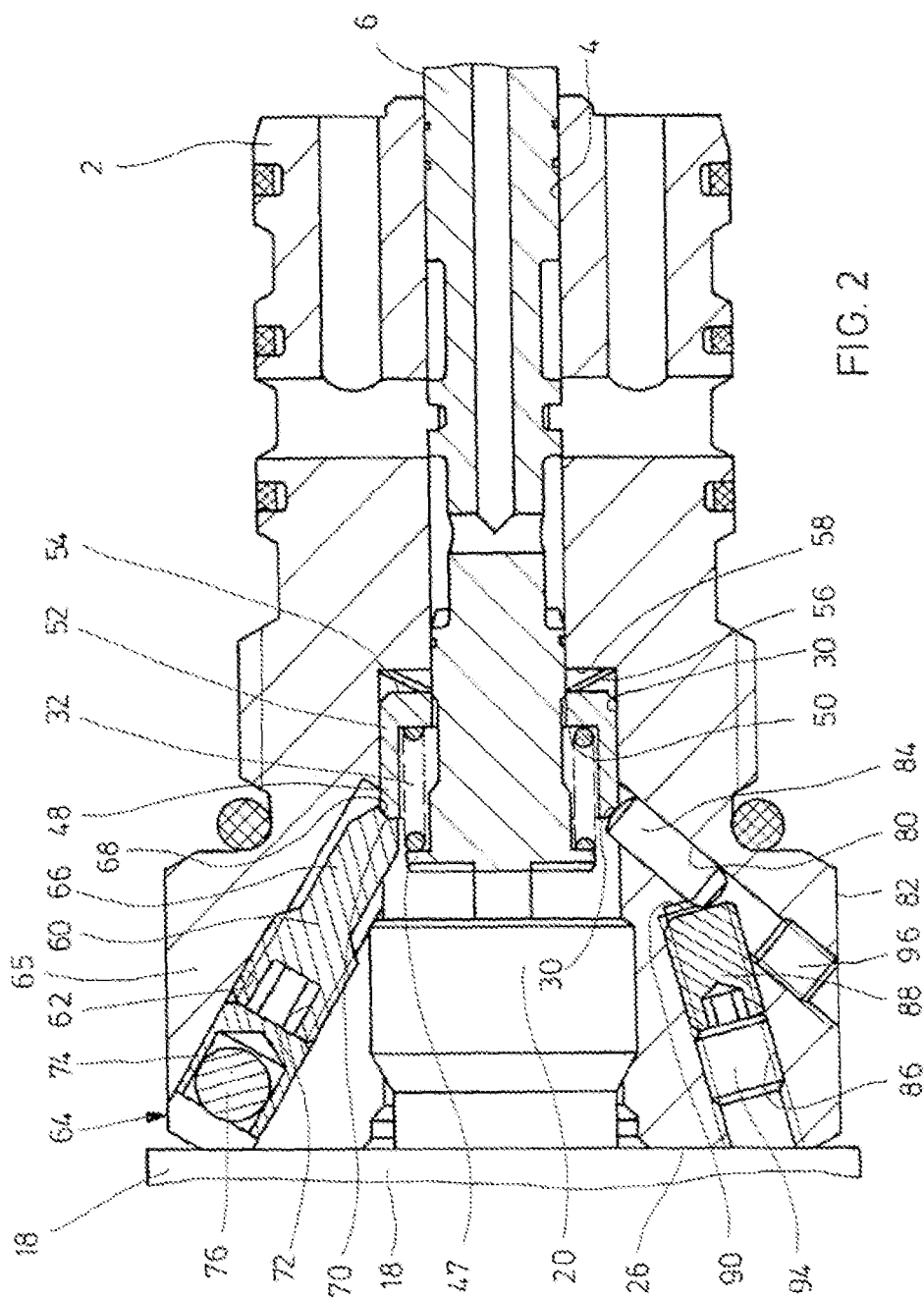
FIG. 2 shows an enlarged detail of the regulating valve from FIG. 1.

According to FIG. 2, the regulating piston 6 is acted upon with a spring force by the counterspring 32 via a radial collar 47 formed on the end portion 14, see also FIG. 1. The radial collar 48 in this case extends away from the end face 12 of the regulating piston 6, see FIG. 1, in the axial direction in the pole tube 20. The counterspring is in this case supported on a spring plate which is designed as a bush 48. A bottom of the bush 48 is pierced by a circular-cylindrical through orifice, so that the regulating piston 6 can be surrounded by the bush 48. The counterspring 32 is supported on an annular inner bottom face 50 of the bush 48. The bush 48 extends with its casing 52 approximately coaxially with the piston bore 4 toward the lifting magnet 18. An outside diameter of the bush 48 in this case corresponds approximately to an inside diameter of the step 30 of the piston bore 4 from FIG. 1, with the result that said bush is guided slidably therein. In the position of the regulating piston 6 shown in FIG. 2, the bush 48 partially with its casing surrounds the counterspring 32. An inside diameter of the bush 48 is somewhat larger than an outside diameter of the radial collar 47 of the regulating piston 6, with the result that the radial collar 47 can penetrate into the bush 48 in the event of displacement of the regulating piston 6 in the adjusting direction.

The bush 48 is acted upon, via its annular end face 54 pointing away from the lifting magnet 18, by a spring force of a supporting spring 56 which is designed as a cup spring and which is supported in turn on a step face 58, pointing toward the lifting magnet 18, of the step 30, see FIG. 1. The supporting spring 56 surrounds the regulating piston 6.

To displace the bush 48 toward or away from the supporting spring 56 and therefore to set a spring force for the counterspring 32, two different embodiments are disclosed according to FIGS. 1 and 2. The first embodiment illustrated in FIGS. 1 and 2 above the longitudinal axis of the regulating valve 1 is explained first.

The first embodiment has, to displace the bush 48 in the longitudinal direction of the piston bore 4, a pin 60 which is arranged in an oblique bore 62. The oblique bore 62 extends from the step 30 of the piston bore 4 at an angle to the longitudinal axis of the piston bore 4 in the direction of the lifting magnet 18. A longitudinal axis of the oblique bore 62 in this case lies approximately in one plane together with the longitudinal axis of the piston bore 4. An angle between the longitudinal axis of the oblique bore 62 and the longitudinal axis of the piston bore 4 may amount, for example, to about 30 degrees. The oblique bore 62 issues approximately in a corner region of the valve housing 2, with the result that a portion of a bore orifice 64 of the oblique bore 62 is formed in the region of the end face 26 of the valve housing 2. The end face 26 is formed on a radial collar 65 of the valve housing 2, which radial collar, in the valve housing 2 is in a state inserted into a housing receptacle, in particular a hydraulic machine housing receptacle, projects out of this housing receptacle. The end face 26 thus forms an outer face of the valve housing 2, said outer face being accessible in the inserted state. The oblique bore 62 is thereby accessible from the outside when the valve housing 2 is in the installed state.

The oblique bore 62 is introduced into the valve housing 2 from an outer region of the latter and, according to the first embodiment, a bore depth of the oblique bore 62 is selected in such a way that a relatively small portion of a bore bottom is still formed in the valve housing 2 and the oblique bore 62 otherwise issues in the piston bore 4. The pin 60 partially projects with an end portion 66 pointing toward the bush 48 into the step 30 of the piston bore 4 and bears with its end face 68 pointing toward the bush 48 against an annular end face 70, pointing toward the lifting magnet 18, of the bush 48. The end face 70 is in this case of frustoconical form and has an inclination angle which corresponds approximately to the inclination angle of the longitudinal axis of the oblique bore 62 to the longitudinal axis of the piston bore 4, with the result that the pin 60 can come to bear over a substantial area by way of its end face 68 which extends approximately radially to the longitudinal axis of the oblique bore 62. A width of the annular end face 70 of the bush 48 corresponds approximately to a diameter of the end face 68 of the pin 60. The pin 60 has, starting from its end face 68, an approximately frustoconical portion, the inclination angle of which corresponds approximately to the inclination angle between the longitudinal axis of the oblique bore 62 and the longitudinal axis of the piston bore 4. The pin 60 is configured, adjoining the frustoconical portion, with a middle approximately circular-cylindrical portion which widens to a threaded end portion, via which the pin 60 is screwed into an internal thread of the oblique bore 62. A screw-in depth of the pin 60 can be altered by means of an appropriate tool via an approximately hexagonal recess 72 of the pin 60, said recess being accessible from the end face 26.

The spring force of the counterspring 32 is set via the screw-in depth of the pin 60. When the spring force is to be lowered, the pin 60 is screwed in the direction of the bush 48, with the result that the latter is displaced toward the step face 58 axially counter to the supporting force of the supporting spring 56. A distance between the radial projection 47 of the regulating piston 6 and the bottom face 50 of the bush 48 is thereby increased, with the result that the spring force of the counterspring 32 falls. To increase the spring force, the pin 60 is screwed in a direction away from the bush 48, with the result that the latter is displaced in the direction away from the step face 58 by the supporting force of the supporting spring 56. A distance of the bottom face 50 of the bush 48 from the radial projection 47 of the regulating piston 6 is thereby reduced and the spring force of the counterspring 32 rises. To fix the pin 60 in the oblique bore 62, said pin is locked by means of an expander 74. The latter is of pot-shaped configuration and its bottom bears against the pin 60. Via a ball 76 inserted into the pot-shaped expander, the latter is pressed sealingly and firmly into the oblique bore 62. In addition, the oblique bore 62 is protected from outside since a magnet coil 78 of the lifting magnet 18 partially overlaps it.

A second embodiment of the adjusting device 34 is illustrated below the longitudinal axis of the regulating valve 1 in FIGS. 1 and 2. This adjusting device has a first oblique bore 80. This passes completely through the valve housing 2 and extends from the step 30 of the piston bore 4 approximately toward the magnet coil 78 and issues in a hexagonal outer surface area 82 of the radial collar 65 of the valve housing 2. The outer surface area 82 extends in the longitudinal direction of the valve housing 2 approximately from the end face 26 of the latter. A longitudinal axis of the first oblique bore 80 lies approximately in a common plane with the longitudinal axis of the piston bore 4. An inclination angle of the longitudinal axis of the first oblique bore 80 to the longitudinal axis of the piston bore 4 amounts to about 50°. A pin 84, which is a cost-effective standard part in the form of a straight pin, is inserted into the first oblique bore 80. A further second oblique bore 86 extends approximately centrally from the first oblique bore 80, issues in the end face 26 of the valve housing 2 and is thus closed by the magnet coil 78 of the lifting magnet 18. An inclination angle of a longitudinal axis of the second oblique bore 86 to the longitudinal axis of the piston bore 4 corresponds to about 15 degrees. The longitudinal axis of the oblique bore 86 in this case lies in a common plane with the longitudinal axis of the first oblique bore 80. An internal thread is introduced into the second oblique bore 86 and has screwed into it a setscrew 88. The latter is likewise a cost-effective standard part. The setscrew 88 bears with its end face 90 against an edge of the pin 84. The pin 84, in turn, bears with its end face 90 against the approximately frustoconically configured end face 70 of the bush 48. An inclination angle of the end face 70 in this case corresponds approximately to the inclination angle of the longitudinal axis of the first step 80 to the longitudinal axis of the piston bore 4.

The setscrew 88 has a hexagonal recess which is accessible from the end face 26 and via which it can be screwed into the second oblique bore 86 by means of an appropriate tool. When the spring force of the counterspring 32 is to be lowered, the setscrew 88 is screwed in the direction of the pin 84, with the result that the pin 84 is displaced in its axial direction toward the bush 48 which is thereby moved in turn in the direction of the step face 58 of the step 30 of the piston bore 4. To tension the spring force of the counterspring 32, the setscrew 88 is screwed away from the pin 84, with the result that the bush 48 is displaced via the supporting force of the supporting spring 56 in a direction away from the step face 58 and the pin 84 is displaced via the supporting force in a direction away from the step 30. To fix the setscrew 88 in the second oblique bore 86 or for counterlocking, an expander 94 is inserted correspondingly to the first embodiment into the second oblique bore 86. A further expander 96 seals off the first oblique bore 86 outwardly and is inserted into the first oblique bore 80 between the region of intersection of the first oblique bore 80 with the second oblique bore 86 and the outer surface area 82.

The setting of the start of regulation of the regulating valve 1 when the latter is inserted as a pivot-angle regulator for the variable-displacement pump is explained below. The regulating valve 1 is in this case inserted into the housing of the variable-displacement pump. In the operating state of the variable-displacement pump, a flow/pivot-angle assignment is then determined To change the start of the regulation, it is necessary merely to alter the spring force of the counterspring 32, which can be set in a simple way via the pin 60 or the setscrew 88. For this purpose, the magnet coil 78 of the lifting magnet 18 is removed, with the result that the pin 60 or setscrew 88 is accessible from the end face 26 when the respective expander 74 or 94 is not inserted. Thereafter, the spring force of the counterspring 32 can be set according to the procedure explained above. When the counter force is set to the desired value, the respective expander 76 or 94 is inserted and the magnet coil 78 is arranged on the lifting magnet 18 again.

According to the disclosure, a regulating valve is disclosed which can be used as an electroproportional pivot-angle regulator for a variable-displacement pump. The regulating valve has a valve housing in which a piston bore with a regulating piston guided therein is formed. The regulating piston can be actuated in an adjusting direction via an actuator, particularly via a lifting magnet. The regulating piston is acted upon in the opposite direction by a spring force of a counterspring. The latter is supported via a spring plate on a supporting spring which is supported in turn on the valve housing. The spring plate is in this case tensioned between the supporting spring and an adjusting device, via which said spring plate can be displaced in relation to the valve housing in or opposite to the adjusting direction (Farrad).

LIST OF REFERENCE SYMBOLS

1 Regulating valve
2 Valve housing
4 Piston bore
6 Regulating piston
8 End portion
10 End face
12 End face
14 End portion
16 Armature tappet
18 Lifting magnet
20 Pole tube
22 Threaded portion
24 Housing side
26 End face
28 Guide portion
30 Step
32 Counterspring
34 Adjusting device
36 Annular groove
38 Annular groove
40 Radial collar
42 Actuating pressure duct
44 Longitudinal bore
46 End face
47 Radial collar
48 Spring plate/bush
50 Bottom face
52 Casing
54 End face
56 Supporting spring
58 Step face
60 Pin
62 Oblique bore
64 Bore orifice
65 Radial collar
66 End portion
68 End face
70 End face
72 Recess
74 Expander
76 Ball
78 Magnet coil
80 First oblique bore
82 Outer surface area
84 Pin
86 Second oblique bore
88 Setscrew
90 End face
92 End face
94 Expander
96 Expander

What is claimed is:

1. A regulating valve, comprising:
   a valve housing defining a piston bore;
   a regulating piston guided slidably in the piston bore, the regulating piston being configured to be displaced axially in an adjusting direction via an actuator;
   a counterspring configured to act upon the regulating piston with a spring force opposite to the adjusting direction, the counterspring being supported on a spring plate that is supported, via its side pointing away from the counterspring, on a supporting spring supported on the valve housing; and
   an adjusting device configured to act upon the spring plate with an adjustable adjusting force counter to a supporting force of the supporting spring, the adjusting device acting on that side of the spring plate which points toward the counterspring.

2. The regulating valve according to claim 1, wherein the adjusting device includes a pin arranged axially displaceably in the valve housing and engaging on that side of the spring plate which points toward the counterspring, the pin being configured to act upon the spring plate with the adjusting force.

3. The regulating valve according to claim 1, wherein the supporting spring is configured as a cup spring.

4. The regulating valve according to claim 1, wherein the spring plate is configured as a bush and the counterspring is at least partially surrounded by the bush.

5. The regulating valve according to claim 2, wherein the pin is arranged in an oblique bore of the valve housing, the oblique bore being formed obliquely to the longitudinal axis of the regulating piston and extending from the spring plate in a direction away from the supporting spring.

6. The regulating valve according to claim 5, wherein the pin is screwed into the oblique bore via a threaded portion.

7. The regulating valve according to claim 5, further comprising a further oblique bore issuing into the oblique bore, wherein a setscrew is screwed in the further oblique bore, and wherein the pin is supported on the setscrew and configured to be displaced axially by the setscrew.

8. The regulating valve according to claim 7, wherein an expander is inserted into the oblique bore or into the oblique bore and the further oblique bore.

9. The regulating valve according to claim 1, further comprising:
   a connection between a tank duct and an actuating pressure duct being controllable by the regulating piston in the adjusting direction; and
   a connection between a delivery pressure duct and the actuating pressure duct being controllable by the regulating piston in the opposite direction, the regulating piston being configured to be acted upon opposite to the adjusting direction by a spring force of a measuring spring.

10. The regulating valve according to claim 7, wherein the actuator is configured as a lifting magnet with a magnet coil, and wherein the oblique bore of the pin or the oblique bore of the setscrew is at least partially covered by the magnet coil from an outside of the valve housing.

11. The regulating valve according to claim 4, wherein the regulating piston includes a radial projection via which the counterspring acts with the spring force upon the regulating piston, the radial projection being configured to penetrate into the bush.

12. The regulating valve according to claim 1, wherein the piston bore has a guide portion configured to slidably guide the regulating piston, the guide portion having a radially widened step adjoining it in the region of an actuator-side end portion of the regulating piston, the radially widened step having a step face which points toward the actuator and on which the supporting spring is supported.

13. The regulating valve according to claim 12, wherein the piston bore has a threaded portion which adjoins the step and into which the actuator is screwed.

14. The regulating valve according to claim 1, wherein the adjusting device is accessible from outside when the valve housing is in a state inserted into a housing.

15. A hydraulic system, comprising:
   a variable-displacement pump of the swashplate type; and
   a regulating valve configured as a pivot-angle regulator, the regulating valve including:
      a valve housing defining a piston bore;
      a regulating piston guided slidably in the piston bore, the regulating piston being configured to be displaced axially in an adjusting direction via an actuator;
      a counterspring configured to act upon the regulating piston with a spring force opposite to the adjusting direction, the counterspring being supported on a spring plate that is supported, via its side pointing away from the counterspring, on a supporting spring supported on the valve housing; and
      an adjusting device configured to act upon the spring plate with an adjustable adjusting force counter to a supporting force of the supporting spring, the adjusting device acting on that side of the spring plate which points toward the counterspring.

16. The regulating valve according to claim 10, further comprising:
   a connection between a tank duct and an actuating pressure duct being controllable by the regulating piston in the adjusting direction; and
   a connection between a delivery pressure duct and the actuating pressure duct being controllable by the regulating piston in the opposite direction, the regulating piston being configured to be acted upon opposite to the adjusting direction by a spring force of a measuring spring.

17. The regulating valve according to claim 14, wherein the housing is a hydraulic machine housing.

* * * * *